July 26, 1949.   E. A. BUTT, JR   2,477,404
FILTER

Filed Sept. 20, 1946   2 Sheets-Sheet 1

Earl A. Butt, Jr
INVENTOR.

BY Ashley & Ashley
ATTORNEYS

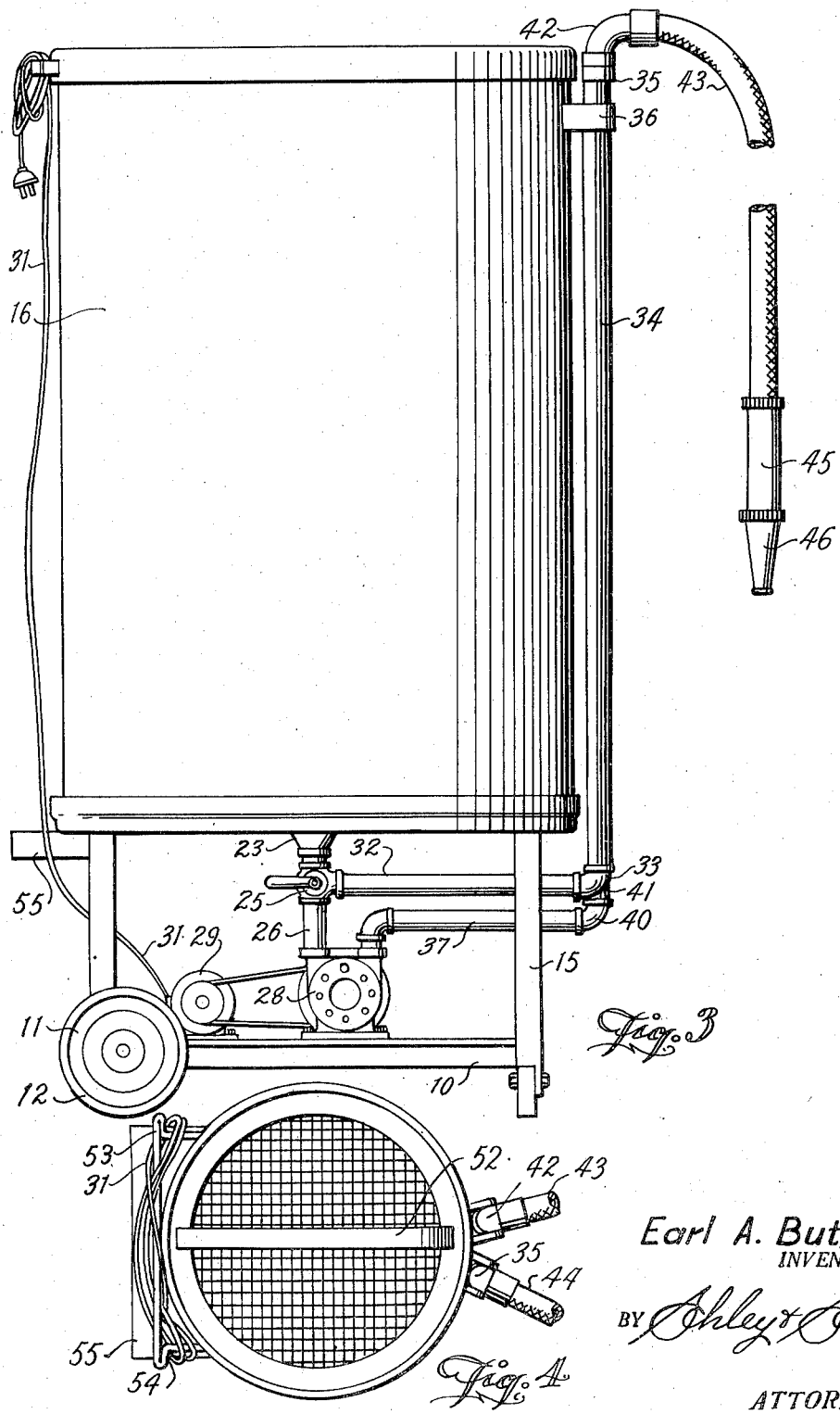

Patented July 26, 1949

2,477,404

UNITED STATES PATENT OFFICE 2,477,404

FILTER

Earl A. Butt, Jr., Chicago, Ill.

Application September 20, 1946, Serial No. 698,198

2 Claims. (Cl. 210—185)

This invention relates to new and useful improvements in filters.

It is one object of this invention to provide an improved filter wherein a high vacuum pump is utilized to draw liquid through the filter, the liquid being discharged directly through the vacuum pump.

It is another object of this invention to provide an improved filter which is portable and wherein provision is made for filling the filtering tank with the same vacuum pump used to filter the liquid from the tank.

Additional object of the invention is to provide an improved filter adapted to be operated under the vacuum exerted by a suction pump and to utilize a relatively thin and inexpensive filter element, the structure of the filter being such as to prevent rupture or collapse of the element.

Another object of the invention is to provide an improved filter having a vacuum exerted between the filter element and the bottom of the filter, the spacing between the element and the bottom being relatively small and being occupied by a section of wire cloth which supports the filter element and filter bottom in spaced apart relation and, at the same time, provides a multitude of intersecting drainage channels for the filtrate.

A still further object of the invention is to provide an improved filter having new and novel means for supporting the filter element and preventing its collapse under pressure, said means providing ample drainage from beneath the element and being inexpensive in nature.

Yet another object of the invention is to provide an improved filter having a convenient and novel means for holding the filter media in place within the filter tank.

A construction designed to carry out the invention will be hereinafter described together with other features of the invention.

Figure 1:
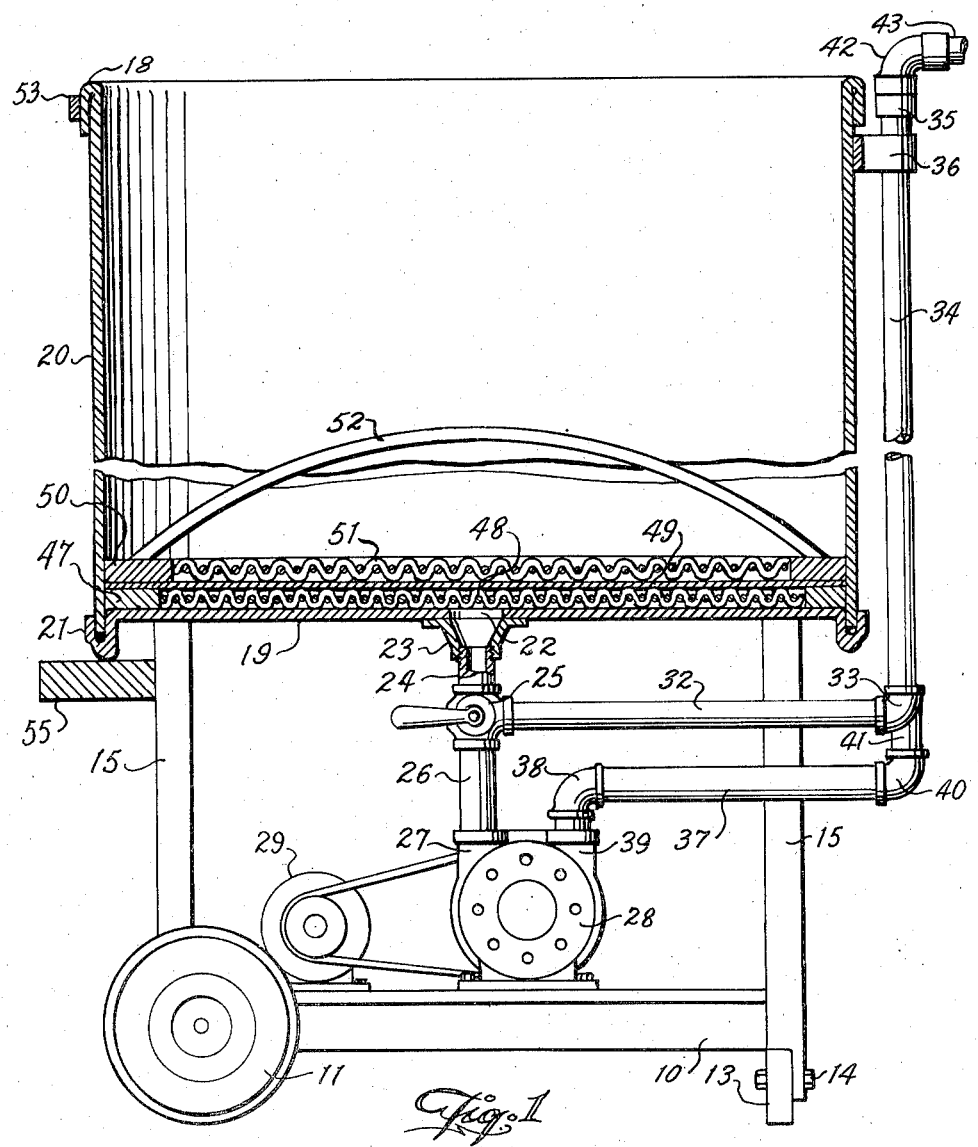
Figure 2:
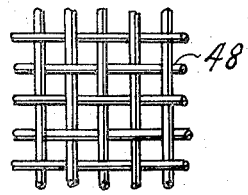

The invention will be more readily understood from a reading of the following specification and by reference to the accompanying drawing, wherein an example of the invention is shown, and wherein:

Fig. 1 is an enlarged, vertical, sectional view of a filter constructed in accordance with this invention, Fig. 2 is an enlarged, plan view of a section of the filter screen, Fig. 3 is a side elevation of the filter, and Fig. 4 is a plan view of the filter.

In the drawings, the numeral 10 designates a horizontal, rectangular platform or support having a pair of transversely spaced ground wheels 11 secured thereto at one end. The wheels 11 may be provided with rubber tires 12, if desired. Short depending legs 13 are secured to the opposite end of the platform 10 by bolts 14, and serve to help support the platform. A pair of upstanding legs 15 are provided at either end of the platform and support an upright cylindrical filter tank 16, having an open top 17. The tank 16 is preferably formed of sheet metal and has its upper peripheral edge 18 doubled back upon itself and crimped to form a smooth rounded upper edge. The bottom 19 of the tank is crimped to the side walls 20 and 21. It is pointed out, that the manner of crimping is such that the marginal portion of the bottom 19 snugly engages both the inner and outer surfaces of the side wall 20 so that a double seal is effected.

A central opening 22 is provided in the bottom 19 in vertical alinement with an adapter fitting 23 riveted or welded, or otherwise suitably secured, to the lower side of the bottom 19.

A nipple 24 is connected into the adapter 23 and receives a three-way valve 25. The valve 25 may be of any suitable or desirable type and is available on the open market. Its details of construction will not be described for that reason. The valve is of the type having an upper and lower branch along with one lateral branch with provision being made for establishing communication between any two or all three of the branches.

The lower branch of the valve 25 is connected through a short length of pipe 26 into the intake side 27 of a high vacuum pump 28. The pump 28 may be of any suitable construction, such as a gear pump, or a vane pump and is capable of developing a suction of 25 to 30 inches of mercury. An electric motor 29 is mounted on the support 10 for driving the pump, a suitable V-belt drive 30 being provided for that purpose. An electric cable 31 is connected to the motor.

The lateral branch of the valve 25 receives a laterally-extending pipe 32 which projects beyond the side of the tank 16 and receives an elbow 33 on its outer end. A vertical pipe 34 is connected to the elbow 33, and terminates near the upper end of the tank 16 in a suitable universal fitting 35. A U-shaped bracket 36 encircles the pipe 34 and is secured to the side wall of the tank 16 for supporting and steadying the pipe 34.

A second pipe 37 is connected through an elbow 38 into the discharge or pressure side 39 of the pump 28, and extends horizontally to a point beyond the side wall of the tank. An elbow 40 is secured to the outer end of the pipe 37 and receives a vertical pipe 41 extending upwardly adjacent the pipe 34 to the upper end of the tank. A universal fitting 42, similar to the fitting 35, is provided at the upper end of the pipe 41, and a second U-shaped bracket 36.

Suitable, flexible hoses 43 and 44 are connected to the universal fittings 35 and 42, respectively, the hoses being several feet in length and having suitable handles 45 and nozzles 46 on their outer ends. It is pointed out, that the universal fittings 35 and 42 permit swinging of the hoses through 360 deg. in a horizontal plane.

A flat, circular ring 47 rests upon the bottom 19 of the tank and has a snug fit with the side walls thereof. A circular disk of relatively heavy wire cloth 48 is disposed upon the bottom 19 within the ring 47. Since the ring is relatively narrow, the screen 48 covers substantially the entire bottom 19 with the exception of a small marginal portion. The screen found most desirable is known as 3 x 3 and has three wires per inch, the wires being 10 gauge. Obviously, similar screening material of any suitable mesh or wire size may be used, or other foraminous supports or spacers may be employed.

A circular filter media or disk 49 is supported in the bottom of the tank upon the upper surface of the screen 48 and the ring 47, the diameter of the disk 49 being substantially equal to the inside diameter of the tank. The disk may be formed of any suitable material such as relatively heavy filter paper, and it is desirable that a relatively inexpensive filtering media be utilized so that the same may be frequently replaced without excessive cost. A flat, circular retainer ring 50 has a sliding fit in the tank 16 so as to rest upon the top portion of the filter disk 49 supported upon the ring 47. A disk 51 of coarse wire cloth screen is disposed within the ring 50, and secured thereto in some suitable fashion such as welding. Three-quarter inch mesh is suitable for the disk 51. When liquid is being forced through the filter media, the flat lower side of the ring 50 and the flat upper side of the ring 47 give a substantially perfect seal with the filter disk 49 so that substantially no leakage occurs.

An arcuate, upwardly bowed handle 52 extends diametrically of the ring 50 and has each end secured to diametrically opposed points of said ring. The handle and ring and screen 51 being thus formed is an integral unit, the entire unit may be readily removed by grasping and raising the handle 52 so that the tank may be cleaned or a new filter disk inserted.

The function of the screen or wire cloth disk 48 is to be stressed. This element has no screening action since the filter element 49 is positioned thereabove. Rather, the disk 48 serves as a structural element to support or space the filter element from the bottom of the tank 16. Being relatively flexible, the disk 48 does not function as a supporting beam as is the usual practice, but lies immediately above the tank bottom and spaces the filter element therefrom. Being relatively incompressible in a transverse plane, the disk 48 prevents the filter element from engaging the tank bottom and shutting off filtering suction from the marginal portions of the filter element. At the same time, the structural nature of the disk provides a large number of intersecting vertical and horizontal channels through which filtrate may flow from all directions to the tank outlet 22.

The filter pump exerts its suction in the thin section between the tank bottom and the filter element. The total resultant pressure on either one of the members may be several thousand pounds. However, the forces on the members are equal, if the members are equal in area, and exerted in opposite directions, so that the only resultant structural stress is a transverse compressive force on the disk 48. This force the disk is well able to withstand. The important point is that the tank bottom, the filter element, and the disk are freed of beam or supporting stresses such as occur in the usual filter. Of course, the tank bottom must support the liquid within the tank, but this is a minor load. Indeed, the tank bottom may be quite light and flexible, and yet function properly due to the forces urging it against the lower face of the disk 48.

In this connection, the flexibility of the disk is an advantage in that it allows the disk to conform to the tank bottom and prevents any major portion of the disk acting as a beam to support the filter element. It is pointed out, that the tank bottom may be made flexible so as to take over this function from the disk 48, or both elements may be made so as to fit relatively snugly whereby substantially no flexing is necessary. The various members may be flat or curved so long as they conform one to the other and substantially eliminate the beam stresses usually encountered.

An elongate horizontal handle 53 is secured to the upper end of the tank by short brackets 54, the handle being disposed above and parallel to the transverse axis of the wheels 11. A rest or support 55 is secured to the upper ends of the legs 15 in vertical alinement and parallel to the handle 53. The support 55 is formed of an elongate section of wood or other material substantially rectangular in cross-section and disposed on the outer sides of the legs so as to project beyond the side wall of the tank. In cleaning out the tank, the entire structure may be tipped about the axis of the wheels 11 and supported in a stable and secure position upon the rest 55 and the handle 53 so as to maintain the tank in a horizontal position. The hoses 43 and 44 may be rested upon the support 55. The electric cable 31 which is connected to the motor 29, may be coiled about the handle 53 when not in use.

In the operation of this filter, the ring 50 is removed from the tank by means of the handle 52 and a clean filter disk 49 laid in the bottom of the tank so as to rest upon the ring 47 of the screen 48. The ring 50 and screen 51 are then placed in position on top of the filter disk so as to hold the same in place and protect it from damage due to incoming liquid to be filtered. The pump 28 is started and the valve 25 shifted to place the lower and the lateral branches in communication. Liquid to be filtered may then be picked up by the hose 43 from a separate receptacle (not shown), and will be directed through the pipes 34 and 32, through the valve 25 and the pipe 26 to the intake side 27 of the pump. The liquid is discharged through the pipes 37 and 41, and the hose 44, which may be directed so as to allow the oil to flow into the tank 16.

When the tank has been filled, the valve 25 may be shifted to place the upper and lower branches of the valve in communication so that the pump draws directly from the tank through the opening 22. Since the pump is capable of developing relatively high vacuums, a considerable force will be brought to bear to force the liquid through the filter disk 49, at the same time forcing the ring 50 downwardly so as to compress the marginal edges of the filter disk between the rings 50 and 47 and prevent leakage therebetween.

In the filtering operation, the screen 48 serves to support the filter disk 49 and prevents rupture of the same, and at the same time provides a multitude of intersecting channels between the wire elements of the screen to permit proper drainage of filtered liquid to the opening 22 and assure efficient use of the entire area of the filter disk. The filter is thus substantially as efficient near its marginal edges as at its center, and faster and more complete filtering is obtained. If desired, a suitable filtering aid such as fuller's earth, or the like, may be utilized to augment the filtering process.

The filtered liquid is drawn through the pump 28 and discharged through the hose 44 to a suitable clean receptacle (not shown). Manifestly, the filtrate may be circulated through the hose 44 back into the tank 16 for a short period of time so as to flush out any unfiltered liquid remaining in the hose 44. As soon as this flushing action is completed, the filtered liquid may be directed to any desired location.

Several batches of liquid may be filtered through the same filter disk, and it is not always necessary to replace the disk when cleaning out the filtering tank 16. However, when such replacement is desired, it may be readily effected by removing the ring 50 and the old filtering disk, and replacing the old disk with a new one.

The provision for supporting the tank in a horizontal position allows quick and thorough cleaning of the inside of the tank 16 along with the elements contained therein. The unit may be tipped about the axis of the wheels 11 so as to be supported on its side on the handle 53 and the support 55. It will be noted that the support 55 projects laterally a greater distance than the handle 53 so that the tank is supported with a slightly downward incline. Residual liquid and the flushing material may thus readily and completely drain from the tank. The ring 50 may be removed by the handle 52 and any desirable flushing and cleaning material used to clean the inside of the tank. Upon completion of the cleaning operation, the tank may be returned to its upright position and the filter disk 49 and plate 50 replaced therein, so that the tank is ready for additional filtering operation.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A portable filter including, a frame mounted on wheels, a tank mounted on the frame and having a closed bottom, a pump of the type having a high intake suction carried on the frame, a conductor extending between the pump and the closed bottom for conducting liquid from the tank to the pump, valve means in the conductor for shutting off communication between the tank and the pump, a flexible second conductor communicating with the intake of the pump, means for shutting off the latter communication, a flexible discharge conductor connected to the discharge of the pump and adapted to conduct the pump discharge selectively to the tank and exteriorly of the tank, pivotal connections in the sceond conductor and the discharge conductor for permitting lateral swinging of these conductors, a supporting member disposed in the bottom of the tank including an imperforate marginal portion and a wire cloth center, a filter element disposed on the supporting member and having its margin engaging the marginal portion of the member, and a retaining element resting on the filter element, said retaining element including a marginal portion overlying the imperforate marginal portion of the supporting member so that the margin of the filter element is engaged therebetween and a wire cloth center.

2. A filter including, a container having a closed bottom, pumping means connected with the container through the closed bottom so as to pump liquid therefrom, a supporting member disposed in the bottom of the container including an imperforate marginal portion and a wire cloth center, a filter element disposed on the supporting member and having its margin engaging the marginal portion of the member, a retaining element resting on the filter element, said retaining element including a marginal portion overlying the imperforate marginal portion of the supporting member so that the margin of the filter element is engaged therebetween, a wire cloth center, and a handle connected to the retaining element for lifting the same.

EARL A. BUTT, Jr.

REFERENCES CITED

The following references are of record in the file of this patent:

UNITED STATES PATENTS

| Number | Name | Date |
|---|---|---|
| 667,005 | Davis | Jan. 29, 1901 |
| 1,472,896 | Alsop | Nov. 6, 1923 |
| 1,595,345 | Lomax | Aug. 10, 1926 |
| 1,769,764 | Barker | July 1, 1930 |
| 1,966,213 | Oelmann | July 10, 1934 |
| 1,983,131 | Hume | Dec. 4, 1934 |
| 2,089,702 | Lomax | Aug. 10, 1937 |
| 2,116,537 | Miller | May 10, 1938 |
| 2,151,538 | Swanson | Mar. 21, 1939 |
| 2,322,428 | Eickemeyer | June 22, 1943 |
| 2,328,436 | Eickemeyer | Aug. 31, 1943 |
| 2,460,423 | Kracklauer | Feb. 1, 1949 |

FOREIGN PATENTS

| Number | Country | Date |
|---|---|---|
| 345,516 | France | Oct. 17, 1904 |